US005648989A

United States Patent [19]

Ko

[11] Patent Number: 5,648,989

[45] Date of Patent: Jul. 15, 1997

[54] LINEAR PREDICTION FILTER COEFFICIENT QUANTIZER AND FILTER SET

[75] Inventor: Kenneth David Ko, Clearwater, Fla.

[73] Assignee: Paradyne Corporation, Largo, Fla.

[21] Appl. No.: 360,906

[22] Filed: Dec. 21, 1994

[51] Int. Cl.$^6$ .............................. H04K 1/02; H04L 25/03; H04L 25/49

[52] U.S. Cl. ........................... 375/296; 375/232; 375/222

[58] Field of Search ........................... 375/296, 229–236, 375/254, 216, 219, 222; 364/724.19, 724.2; 333/18, 28 R

[56] References Cited

U.S. PATENT DOCUMENTS 5,226,060 7/1993 Goodson et al. ........................ 375/232

5,282,225 1/1994 Nikias et al. ........................... 375/232

*Primary Examiner*—Stephen Chin
*Assistant Examiner*—Hai H. Phan
*Attorney, Agent, or Firm*—Thomas, Kayden, Horstemeyer & Risley

[57] ABSTRACT

A simultaneous voice and data (SVD) modem includes a preemphasis filter for processing an audio source signal, e.g., a voice signal, before transmission to a far-end SVD-capable modem. The preemphasis filter implements a second order linear predictor in which a quantized set of predictor coefficients are selected directly from the normalized autocorrelation coefficients. In addition, an index is associated with the selected set of predictor coefficients. This index is transmitted to an opposite SVD-capable modem, which thereby allows the opposite SVD-capable modem to select the same set of predictor coefficients for use in recovering the voice signal at the opposite endpoint.

26 Claims, 4 Drawing Sheets

| $\rho_1''$ | $\hat{\rho}_1$ | C | I | L | CI |
|---|---|---|---|---|---|
| $\rho_1'' < -0.2$ | $-\sqrt{.25}$ | -.499 | .15 | 4 | 0 |
| $-0.2 \le \rho_1'' < -0.1$ | $-\sqrt{.15}$ | -.699 | .17 | 4 | 5 |
| $-0.1 \le \rho_1'' < -0.018$ | $-\sqrt{.05}$ | -.899 | .19 | 4 | 10 |
| $-0.018 \le \rho_1'' < 0.018$ | 0 | -.999 | .20 | 5 | 15 |
| $0.018 \le \rho_1'' < 0.1$ | $\sqrt{.05}$ | -.899 | .19 | 4 | 21 |
| $0.1 \le \rho_1'' < 0.2$ | $\sqrt{.15}$ | -.699 | .17 | 4 | 26 |
| $0.2 \le \rho_1'' < 0.3$ | $\sqrt{.25}$ | -.499 | .15 | 4 | 31 |
| $0.3 \le \rho_1'' < 0.4$ | $\sqrt{.35}$ | -.299 | .13 | 4 | 36 |
| $0.4 \le \rho_1'' < 0.5$ | $\sqrt{.45}$ | -.099 | .11 | 4 | 41 |
| $0.5 \le \rho_1'' < 0.6$ | $\sqrt{.55}$ | .101 | .09 | 4 | 46 |
| $0.6 \le \rho_1'' < 0.7$ | $\sqrt{.65}$ | .301 | .07 | 3 | 51 |
| $0.7 \le \rho_1'' < 0.8$ | $\sqrt{.75}$ | .501 | .05 | 3 | 55 |
| $0.8 \le \rho_1'' < 0.9$ | $\sqrt{.85}$ | .701 | .03 | 2 | 59 |
| $0.9 \le \rho_1''$ | $\sqrt{.95}$ | .901 | .01 | 1 | 62 |

*FIG. 6*

PRE-EMPHASIS FILTER COEFFICENT SETS

| $\rho_1$ | V | $h_1$ | $h_2$ | $\rho_1$ | V | $h_1$ | $h_2$ |
|---|---|---|---|---|---|---|---|
| | 0 | 0.884995209 | 0.78321652 | | 32 | −0.7964956881 | 0.626573216 |
| $-\sqrt{.25}$ | 1 | 0.7964956881 | 0.626573216 | $\sqrt{.25}$ | 33 | −0.7079961672 | 0.469929912 |
| | 2 | 0.7079961672 | 0.469929912 | | 34 | −0.6194966463 | 0.313286608 |
| | 3 | 0.6194966463 | 0.313286608 | | 35 | −0.5309971254 | 0.156643304 |
| | 4 | 0.5309971254 | 0.156643304 | | 36 | −1.0471404528 | 0.78321652 |
| | 5 | 0.6855143412 | 0.78321652 | | 37 | −0.9424264075 | 0.626573216 |
| | 6 | 0.6169629071 | 0.626573216 | $\sqrt{.35}$ | 38 | −0.8377123623 | 0.469929912 |
| $-\sqrt{.15}$ | 7 | 0.54841147291 | 0.469929912 | | 39 | −0.7329983170 | 0.313286608 |
| | 8 | 0.47986003881 | 0.313286608 | | 40 | −0.6282842717 | 0.156643304 |
| | 9 | 0.41130860471 | 0.156643304 | | 41 | −1.1873456683 | 0.78321652 |
| | 10 | 0.39578188941 | 0.78321652 | | 42 | −1.0686111014 | 0.626573216 |
| | 11 | 0.3562037005 | 0.626573216 | $\sqrt{.45}$ | 43 | −0.9498765346 | 0.469929912 |
| $-\sqrt{.05}$ | 12 | 0.3166255115 | 0.469929912 | | 44 | −0.8311419678 | 0.313286608 |
| | 13 | 0.2770473226 | 0.313286608 | | 45 | −0.7124074010 | 0.156643304 |
| | 14 | 0.2374691337 | 0.156643304 | | 46 | −1.3126600260 | 0.78321652 |
| | 15 | 0.0 | 0.78321652 | | 47 | −1.1813940234 | 0.626573216 |
| | 16 | 0.0 | 0.626573216 | $\sqrt{.55}$ | 48 | −1.0501280208 | 0.469929912 |
| | 17 | 0.0 | 0.469929912 | | 49 | −0.9188620182 | 0.313286608 |
| 0 | 18 | 0.0 | 0.313286608 | | 50 | −0.7875960156 | 0.156643304 |
| | 19 | 0.0 | 0.156643304 | | 51 | −1.4270118962 | 0.78321652 |
| | 20 | 0.0 | 0.0 | | 52 | −1.2843107066 | 0.626573216 |
| | 21 | −0.3957818894 | 0.78321652 | $\sqrt{.65}$ | 53 | −1.1416095170 | 0.469929912 |
| | 22 | −0.3562037005 | 0.626573216 | | 54 | −0.9989083273 | 0.313286608 |
| $\sqrt{.05}$ | 23 | −0.3166255115 | 0.469929912 | | 55 | −1.5328566664 | 0.78321652 |
| | 24 | −0.2770473226 | 0.313286608 | | 56 | −1.3795709998 | 0.626573216 |
| | 25 | −0.2374691337 | 0.156643304 | $\sqrt{.75}$ | 57 | −1.2262853332 | 0.469929912 |
| | 26 | −0.6855143412 | 0.78321652 | | 58 | −1.0729996665 | 0.313286608 |
| | 27 | −0.6169629071 | 0.626573216 | | 59 | −1.6318505348 | 0.78321652 |
| $\sqrt{.15}$ | 28 | −0.5484114729 | 0.469929912 | $\sqrt{.85}$ | 60 | −1.4686654813 | 0.626573216 |
| | 29 | −0.4798600388 | 0.313286608 | | 61 | −1.3054804278 | 0.469929912 |
| | 30 | −0.4113086047 | 0.156643304 | | 62 | −1.7251732597 | 0.78321652 |
| $\sqrt{.25}$ | 31 | −0.884995209 | 0.78321652 | $\sqrt{.95}$ | 63 | −1.5526559337 | 0.626573216 |

LINEAR PREDICTION FILTER COEFFICIENT QUANTIZER AND FILTER SET

BACKGROUND OF THE INVENTION

The present invention relates to data communications equipment, e.g., modems. In particular, this invention relates to the transmission of both voice and data signals over the same communications facility.

The co-pending, commonly assigned, U.S. Patent application of Bremer et al. entitled "Simultaneous Analog and Digital Communication," Ser. No. 08/076505, filed on Jun. 14, 1993, describes a simultaneous voice and data (SVD) modem in which a voice signal is added to a data signal for transmission over a communications channel to a receiving modem.

In this simultaneous analog and digital communication system, the data signal to be transmitted is represented by a sequence of data symbols, where each data symbol is associated with a particular N-dimensional signal point value taken from a signal space. Similarly, the analog signal, which is represented by a voice signal, is processed so that it is mapped into the N-dimensional signal space to provide a voice signal point. This voice signal point defines the magnitude and angle of a voice signal vector about the origin of the signal space. The data symbol and the voice signal vector are then added together to select a resultant N-dimensional signal point, which is then transmitted to a far-end modem.

Upon reception of the transmitted N-dimensional signal point, the receiver of the far-end modem detects the embedded data symbol and subtracts the data symbol from the received N-dimensional signal point to yield the voice signal vector. This voice signal vector is then used to recreate the voice signal.

As a result, separate full duplex audio and data channels are maintained within a single Public Switched Telephone Network (PSTN) circuit via the division of the data constellation into audio regions as opposed to discrete data points. The region in which a symbol is transmitted during a given baud time determines the data being sent for that symbol, while the location within the region determines the audio signal being sent during that time period.

In such a system, it is desirable to process the audio signal to increase its immunity to noise and other impairments generated in the PSTN channel. One of the forms of processing available is to reduce the amount of redundancy in the transmitted signal by means of linear prediction—that is, to generate an estimate of the current sample as a linear combination of past samples and then subtract this estimate from the actual current sample. The remainder, or residual, is then transmitted in place of the original signal to a receiver. In addition, information on how to form an estimate is also transmitted. The receiver uses the latter information to regenerate the estimate of the signal, which is then added to the received residual to form a reconstituted original signal.

Conventional linear predictors of speech signals are typically of 8th, 10th, or higher order. The order refers to the number of past samples used to estimate the current sample. In generating the estimate of the current sample, each past sample is multiplied by a "predictor coefficient." The resulting products are then additively combined to provide the estimate of the current sample. The predictor coefficients are themselves generated periodically, based on short-term statistical evaluation of the input samples. Typically, these predictor coefficients are quantized, i.e., restricted to a finite set of values.

Unfortunately, determining the quantized predictor coefficients at any point in time is a complex process—especially within the hardware constraints of a modem. Typically, "ideal", or non-quantized, prediction coefficients are first derived as a function of "normalized" autocorrelation coefficients of each sample. This, in itself, adds significant complexity. Finally, once the ideal prediction coefficients have been generated, the ideal prediction coefficients are quantized via a quantization table.

SUMMARY OF THE INVENTION

I have realized a simplified method for quantizing the predictor coefficient set in a linear predictor. In particular, and in accordance with the invention, the quantized prediction coefficients are selected as a function of the normalized autocorrelation coefficients but without the need for the intermediate step of generating the ideal prediction coefficients.

In an embodiment of the invention, an SVD modem includes a preemphasis filter for processing an audio source signal, e.g., a voice signal. The preemphasis filter implements a second order linear predictor. The latter selects a set of quantized prediction coefficients for multiplication of the two previous samples to provide an estimate of the current sample. The selected set of quantized prediction coefficients is directly determined as a function of the normalized autocorrelation coefficients without generating the ideal prediction coefficients.

Tightly coupled with the quantization method is the generation of a set of filters with quantized coefficients. This set of filters has certain properties advantageous both to the performance of the linear prediction system and to the simplification of the quantization algorithm.

BRIEF DESCRIPTION OF THE DRAWING

FIG. 6 shows an illustrative table for selecting the predictor coefficients in accordance with the principles of the invention.

DETAILED DESCRIPTION

Figure 1:
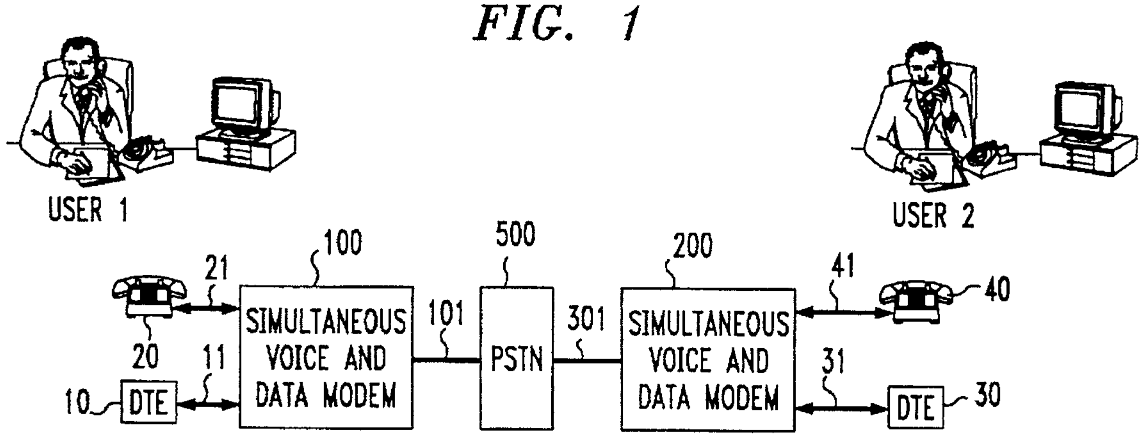
FIG. 1 shows a block diagram of a simultaneous voice and data communications system embodying the principles of the invention.

A block diagram of a simultaneous voice and data communications system embodying the principles of the invention is shown in FIG. 1. As shown in FIG. 1, there are illustratively two communications endpoints represented by user 1 and user 2. The equipment of user 1 includes DTE 10, telephone 20, and SVD modem 100. DTE 10 is coupled to SVD modem 100 via line 11. Telephone 20 is coupled to SVD modem 100 via line 21, which illustratively represents a "tipking" type of electrical interface. SVD modem 100 is coupled to public switched telephone network (PSTN) 500, via local loop 101, for originating and answering telephone calls. Local loop 101 is a typical "tip/ring" facility, i.e., a wire-pair, upon which a voice-band signal is transmitted between SVD modem 100 and PSTN 500. Similarly, the equipment of user 2 also includes an SVD modem, telephone, and DTE, and is coupled to PSTN 500 in a like-fashion as that of the equipment of user 1. Finally, the signal connections between the data communications equipment, represented by SVD modems 100 and 200, and respective data terminal equipment, represented by DTEs 10 and 30, are assumed to conform to the Electronic Industry Association (EIA) RS-232 interface.

Before describing the inventive concept below, a description of the general operation of an SVD modem is provided using SVD modem 100 as an example. The basic operation of an SVD modem is also described in the commonly assigned, co-pending, U.S. patent application of Bremer et al. entitled "Simultaneous Analog and Digital Communication," Ser. No. 08/076505, filed on Jun. 14, 1993.

Figure 2:
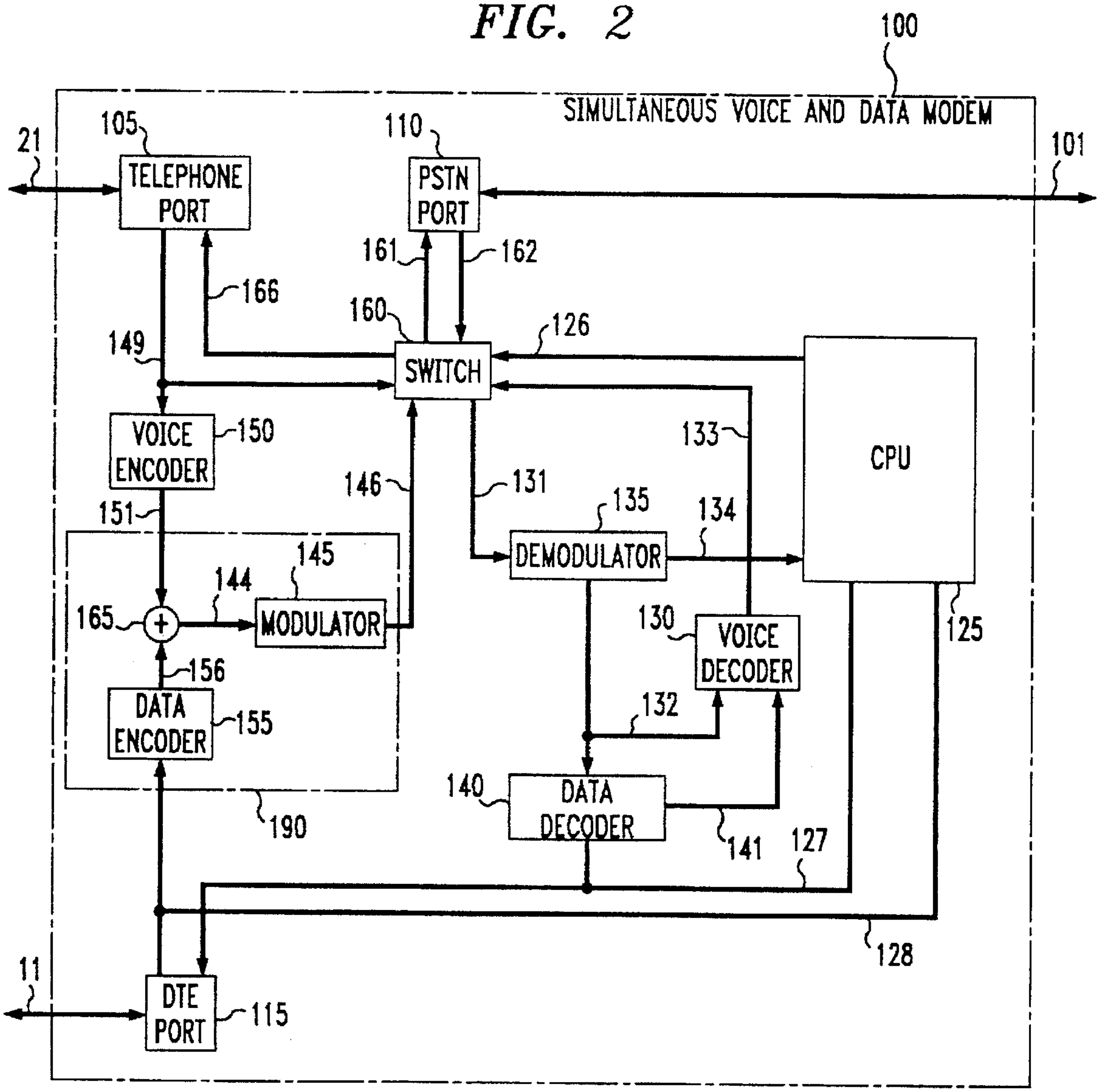
FIG. 2 shows a block diagram of a simultaneous voice and data modem.

FIG. 2 shows an illustrative block diagram of SVD modem 100. SVD modem 100 operates in either a "voice-only" mode, a "data-only" mode, or an SVD mode. In the "voice-only" mode, SVD modem 100 simply communicates a signal, e.g., a voice signal, present on telephone port 105 to PSTN port 110. In the "data-only" mode, SVD modem 100 modulates a data signal received via DTE port 115 for transmission via PSTN port 110 to a remote data endpoint, and demodulates a modulated data signal received via PSTN port 110 for transmission to DTE 10. Finally, in the SVD mode, SVD modem 100 provides the combination of the "voice-only" and "data-only" mode with the exception that the signal received and transmitted via PSTN port 110 is a combined voice and data signal (hereafter referred to as an "SVD signal"). Other than the inventive concept, the individual components of SVD modem 100 are well-known and are not described in detail. For example, CPU 125 is a microprocessor-based central processing unit, memory, and associated circuitry for controlling SVD modem 100.

CPU 125, of SVD modem 100, controls switch 160, via line 126, as a function of the above-mentioned operating mode of SVD modem 100. In the "voice-only" mode, switch 160 couples any signal on line 162 to line 166 for transmission via telephone port 105, and couples any signal on line 149 to line 161 for transmission via PSTN port 110. The remaining components, e.g., data encoder 155, data decoder 140, voice decoder 130, and voice encoder 150, are disabled by control signals (not shown) from CPU 125. Consequently, in the "voice-only" mode any analog signal appearing at one of the analog ports is coupled, or bridged, to the other analog port.

If SVD modem 100 is in the "data-only" mode, switch 160 couples any signal on line 146 to line 161 for transmission via PSTN port 110, and couples any signal on line 162 to line 131. In the "data-only" mode, voice encoder 150 and voice decoder 130 are disabled by control signals (not shown) from CPU 125. In this mode of operation, any data signal appearing at DTE port 115 (assuming SVD modem 100 is not receiving "AT commands") is encoded by data encoder 155. DTE port 115 is assumed to represent the above-mentioned EIA RS-232 interface. The latter couples not only data from DTE 10 for transmission to an opposite endpoint, but also couples commands from DTE 10 to SVD modem 100 during the well-known "AT command mode" of operation. Data encoder 155 includes any of the well-known encoding techniques like scrambling, trelliscoding, etc., to provide a sequence of symbols on line 156 at a symbol rate, 1/T to modulator 145. The symbols are selected from a two-dimensional signal space (not shown). Note, since voice encoder 150 is disabled, adder 165 does not add a signal to the output signal from data encoder 155. Modulator 145 illustratively provides a quadrature amplitude modulated signal (QAM) to PSTN port 110 via switch 160. Similarly in the reverse direction, a QAM signal received at PSTN port 110 is provided to demodulator 135 via switch 160. Demodulator 135 provides an encoded data stream to data decoder 140. The latter performs the inverse function of data encoder 155 and provides a received data signal to DTE port 115 for transmission to DTE 10.

Finally, if SVD modem 100 is in the SVD mode, switch 160 couples any signal on line 146 to line 161 for transmission via PSTN port 110, and couples any signal on line 162 to line 131. In the SVD mode, voice encoder 150 and voice decoder 130 are enabled by control signals (not shown) from CPU 125. In this mode, any analog signal, e.g., a voice signal, appearing on line 149 is applied to voice encoder 150. The latter processes the voice signal so that it is mapped into the two-dimensional signal space used by data encoder 155 to provide a voice signal point. This voice signal point defines the magnitude and angle of a "voice signal vector" about the origin of the two-dimensional signal space. Voice encoder 150 provides a sequence of two-dimensional signal points, at the predefined symbol rate of 1/T symbols per sec., on line 151. Adder 165 adds each voice signal vector on line 151, if any, to a respective one of the symbols provided by data encoder 155 to provide a stream of signal points to modulator 145. As described above, modulator 145 provides a QAM modulated signal to PSTN port 110 via switch 160. This QAM modulated signal is the above-mentioned SVD signal since it represents both voice and data.

In the reverse direction, the received SVD signal on line 131 is processed as described above by demodulator 135 and data decoder 140 to provide the received data signal on line 127. In addition, voice decoder 130 receives both the received signal point sequence from demodulator 135 and the decoded symbol sequence from data decoder 140. Voice decoder 130 includes suitable buffering to allow for the decoding time needed by data decoder 140 to make a decision as to a received symbol. Voice decoder 130 subtracts the received symbol provided by data decoder 140 from the respective received signal point provided by demodulator 135 to yield the voice signal vector and then performs the inverse function of voice encoder 150 to provide a received voice signal to telephone port 105, via line 133.

As a result, this SVD technique advantageously provides a voice-band signal that has both an audio portion and a data portion, hereafter referred to as the analog channel and the data channel, respectively. This allows two users, or endpoints, with simultaneous voice and data capable modems to communicate data between them and talk at the same time—yet only requires one "tip/ring" type telephone line at each user's location.

Figure 3:
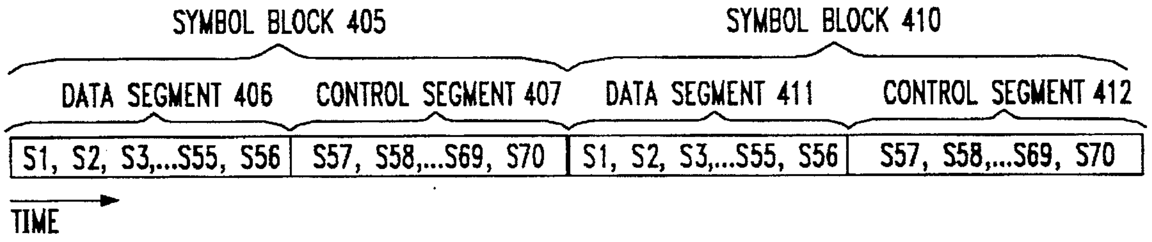
FIG. 3 is an illustrative SVD symbol block that provides a secondary communications channel.

Once both modems are communicating in the SVD mode, it is necessary for each SVD modem to communicate control and status information to the opposite endpoint. This is done via a secondary channel that communicates signaling information between, e.g., SVD modem 100 and SVD modem 200, and can be implemented in any number of ways. For example, as is known in the art, a secondary channel can be provided by multiplexing the data modulated signal (here the SVD signal) with another control signal; or a secondary channel can be provided as described in the co-pending, commonly assigned, U.S. patent application of Bremer et al.

entitled "Side-Channel Communications in Simultaneous Voice and Data Transmission," Ser. No. 08/151686, filed on Nov. 15, 1993. FIG. 3 shows a diagram of a transmission scheme that includes a side-channel within an SVD signal. This SVD side-channel not only provides for the transport of additional information between any SVD endpoints—but also allows the voice signal to be transmitted across the full bandwidth of the SVD data connection. As can be observed from FIG. 3, information from an SVD modem is provided in a frame, or "symbol block," e.g., symbol block 405. For the purposes of this example, a symbol block comprises 70 symbols. Consecutive symbols within each symbol block are identified as S1, S2, S3 . . . S70. Each symbol block is further divided into a data segment, e.g., data segment 406; and a control segment, e.g., control segment 407. Let the group of symbols in the data segment be S1 to S56. These are the "data symbols" and always convey DTE data. For the purposes of the following discussion the symbol rate is illustratively 3000 symbols/second (s/sec.), although other symbol rates may be used, e.g., 2800 s/sec. At a symbol rate of 3000 s/sec., the average data symbol rate of a symbol block is equal to ((56/70)×3000)=2400 s/sec. Consequently, if there are 6 bits of data per data symbol, the resultant data rate is 14400 bits/sec (bps). It is assumed that this data rate is high enough to meet a user's needs so that the remaining bandwidth of the SVD data connection can be allocated to the control segment, which provides the sidechannel.

The remaining symbols of the control segment, i.e., S57 to S70, are the "control symbols." Usually, the latter never convey DTE data, but convey control information. Each control symbol represents a number of "control bits." For example, some of these control bits represent a state identifier, which provides information to the far-end, or receiving, SVD modem as to the mode of operation of the transmitting SVD modem, i.e., whether the transmitting SVD modem is in the "data-only" mode, or SVD mode, of operation. The control symbols are encoded and scrambled the same as the DTE data symbols, e.g., they use the same signal space. The control symbols provide the sidechannel for conveying additional signaling information between SVD modem endpoints. Although the data symbols represent user data and the control symbols represent control information, both the data and control symbols may also convey analog data, which in this example is any voice signal that is provided to SVD modem 100 by telephone 20. As a result, the side-channel is a part of the simultaneous voice and data transmission.

Having described the general operation of an SVD modem, the inventive concept will now be described by reference to FIG. 4. As can be observed from FIG. 4, a portion of the block diagram of SVD modem 100 has been redrawn to better describe the inventive concept. In particular, voice encoder 150 comprises, among other elements, sampler 170 and a "linear predictor," which is a form of "preemphasis filter." The latter illustratively comprises linear prediction coefficient generator 175, analysis filter 180, and adder 185. Sampler 170 is, for example, a CODEC, and the linear predictor is typically implemented in a digital signal processor (DSP). The linear predictor receives a sampled analog input signal on line 174 and provides an output signal, i.e., a "residual signal," on line 151 to SVD system 190. The latter functions as described above in the SVD mode to provide an SVD signal on line 146 for transmission to SVD modem 200. The residual signal is not quantized or coded in any digital form before transmission but is transmitted as a substantially analog signal. In addition, an "index" (described below) is also transmitted to far-end SVD modem 200 via the above-described secondary channel. The value of this "index" is a priori associated with the particular set of predictor coefficients used to form the corresponding transmitted residual signal. Upon receiving the transmitted index, far-end SVD modem 200 simply "looks-up" the associated set of predictor coefficients, which are then applied to a synthesis filter and recursive adder (not shown), which perform the inverse function of the linear predictor to approximate the original analog input signal. The synthesis filter has the effect of shaping any added noise to match the estimated spectrum of the input signal, which enhances the perceived quality of the output.

Them are several major benefits to using linear prediction of the analog signal in an SVD system. First, the residual signal is generally substantially lower in energy than the original sampled analog input signal. This allows more gain to be applied to this signal before transmission, improving the signal-to-noise ratio relative to that achievable with the original signal. Second, analysis filter 180 (described below) tends to reduce the variation in power of the residual signal as observed in the frequency domain. This "whitening" of the transmitted signal effectively pre-emphasizes the signal adaptively, generating the optimum spectrum to insure that impairments generated during transmission do not affect the signal in some frequency bands substantially more than in other frequency bands. Third, the synthesis filter (not shown) in the receiver shapes the added noise in the frequency domain, forcing it to conform to a spectral shape similar to that of the transmitted signal. This provides a substantial perceived improvement in audio quality, since the noise energy is concentrated in the same frequency bands as the majority of the audio energy and is, in effect, "hidden" under the audio peaks.

In this example, the residual signal, e(n), is represented by the following equation:

$$e(n)=x(n)-\hat{x}(n), \quad (1)$$

where x(n) is the input signal on line 174 at time n; and $\hat{x}(n)$ is an estimate of the input analog signal at time n. The estimate of the input analog signal is provided by analysis filter 180, via line 181. This estimate, $\hat{x}(n)$ is equal to:

$$\hat{x}(n)=h_1x(n-1)+h_2x(n-2), \quad (2)$$

where $h_1$ and $h_2$ are the selected predictor coefficients, and x(n−1), x(n−2) are two prior samples of the input analog signal. The selected predictor coefficients are provided by linear prediction coefficient generator 175 via line 176 (described further below). As a result of equations (1) and (2), the residual signal, e(n) is equal to:

$$e(n)=x(n)-h_1x(n-1)-h_2x(n-2). \quad (3)$$

Equation (3) is a "second order" linear predictor because the residual signal, e(n), is a function of a linear combination of two past samples—x(n−1), and x(n−2)—in order to generate an estimate of the input analog signal.

Figure 4:
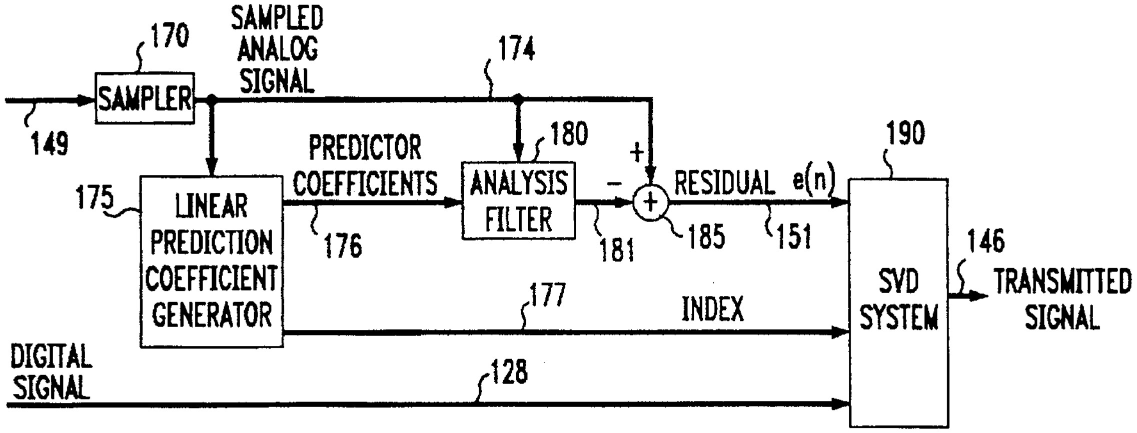
FIG. 4 is an illustrative block diagram of a portion of SVD modem 100 embodying the principles of the invention.

Turning away from FIG. 4, for the moment, a brief description of a prior art process for selecting the prediction coefficients is presented. The selected prediction coefficients, $h_1$ and $h_2$, as known in the art, are typically derived as illustrated by the following sequence as represented by equations (4) through (9).

First, the normalized autocorrelation coefficients are calculated as follows:

$$\sigma_1=\alpha_1/\alpha_0, \text{ and} \tag{4}$$

$$\sigma_2=\alpha_2/\alpha_0, \tag{5}$$

where $\sigma_1$ and $\sigma_2$ represents the normalized autocorrelation coefficients of samples x(n−1) and x(n−2), respectively, and where $\alpha_2$, $\alpha_1$, and $\alpha_0$ represent autocorrelation coefficients as known in the art for the current and two prior samples. The general equation for an autocorrelation coefficient is:

$$a_n=\sum_{i=0}^{N} x(i)x(i+n), \tag{6}$$

where n represents the order of the coefficient and i is indexed over N+1 samples.

These autocorrelation coefficients are typically chosen for a "block," or "frame," of data.

Then a value α is defined as:

$$\alpha=1/(1-\sigma_1^2) \tag{7}$$

From this, the ideal predictor coefficients, $h_{1(ideal)}$ and $h_{2(ideal)}$ are defined as:

$$h_{1(ideal)}=\sigma_1(1-\sigma_2)\alpha, \text{ and} \tag{8}$$

$$h_{2(ideal)}=(\sigma_2-\sigma_1^2)\alpha, \text{ and} \tag{9}$$

The calculated values of $h_{1(ideal)}$ is then quantized, or sliced, to one of a set of finite values to yield $h_1'$. A similar operation is performed on $h_{2(ideal)}$ to yield $h_2'$. Although uniform quantization is simplest to implement, the resulting set of quantized coefficients may provide poor performance relative to more complex forms of non-uniform quantization. Vector quantization may also be used, at the expense of further increasing the level of complexity.

Unfortunately, the above-described steps entail significant overhead when implemented in the typical modem hardware available today. Therefore, and in accordance with the inventive concept, I have determined a simpler method for selecting a set of predictor coefficients. The method does not require the division shown in equation (7) of the prior art approach described above, requires fewer instructions overall than even a simple prior art approach using uniform quantization, provides the performance benefits of non-uniform and vector quantization, and is easily implemented in a fixed point signal processor.

Returning to FIG. 4, it is assumed that the analog input signal conveyed by line 174 is divided in time into blocks, or frames, of a sampled length short enough that the analog input signal within each frame can be considered to be stationary in the short term. Usually, these frames will be from 20 to 35 milli-seconds (ms.) long. For each frame, the analog input signal is analyzed by linear prediction coefficient generator 175, and the latter generates a set of prediction coefficients $h_1$ and $h_2$ for use by linear analysis filter 180. In addition, an "index" corresponding to the selected set of prediction coefficients is provided on line 177 for transmission to far-end SVD modem 200.

In accordance with the inventive concept, linear prediction coefficient generator 175 performs the following steps in directly selecting a set of prediction coefficients.

First, the normalized autocorrelation coefficients are calculated as follows:

$$\sigma_1=\alpha_1/\alpha_0, \text{ and} \tag{10}$$

$$\sigma_2=\alpha_2/\alpha_0. \tag{11}$$

Equations (10) and (11) are identical to equations (4) and (5) described above. These autocorrelation coefficients are typically chosen over the above-described frame of data.

Next, a modified form of $\sigma_1$ is determined:

$$\sigma_I'=\sigma_1\times c_1, \tag{12}$$

where $c_1\approx 0.995$.

From equation (12), the following value is calculated:

$$\sigma_1''=(\rho_1')^2\times \mathrm{sgn}(\sigma_1'), \tag{13}$$

where sgn0 is the well-known sign function.

Figures 5, 7:
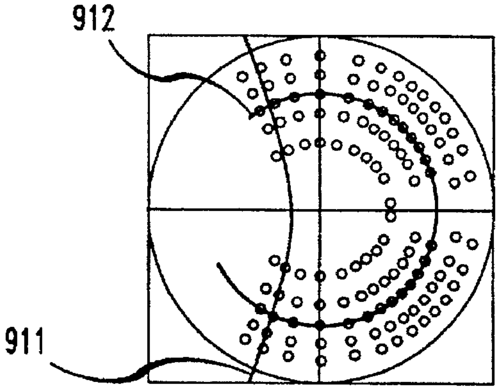
FIG. 5 shows an illustrative table for selecting a quantized value of a normalized autocorrelation coefficient in accordance with the principles of the invention.
FIG. 7 shows a pole-zero plot of the collection of filters represented by the table of FIG. 6.

The value of $p_1'$ is then quantized, or sliced, according to the table shown in FIG. 5 to generate $\hat{\sigma}_1$, the quantized value of $\sigma_1$. For example, if the value of $p_1''$ is between (−0.1) and (0.018), then the value of $\hat{\sigma}_1$ is $(-\sqrt{.05})$. Note that, with the exception A of two increments for values near zero, the quantization shown in FIG. 6 is uniform with respect to the input value.

From this quantized value of $\sigma_1$, $\sigma_2'$, is calculated as follows:

$$\sigma'_2=\sigma_2+8\sigma_1(\sigma_1-\sigma_1), \text{ when } \sigma_1<0.45, \text{ or} \tag{14a}$$

$$\sigma'_2{}'\sigma_2 4\sigma_1(\hat{\sigma}_1-\sigma_1), \text{ when } \sigma_1\geqq 0.45. \tag{14b}$$

The variable $\sigma_2'$ compensates for the difference between the actual value of $\sigma_1$ and the quantized value $\hat{\sigma}_1$. It should be noted that a variation on this adjustment could be:

$$\rho_2'=\rho_2+C\sqrt{\hat{\rho}_1}\,(\hat{\rho}_1-\rho_1). \tag{15}$$

After calculating $\sigma_2'$, a "quantization index," Q, is determined according to the following equation:

$$Q=\left\lceil \frac{(\rho_2'-c_2)}{I} \right\rceil, \tag{16}$$

where offset value $c_2$ and scaler I are selected from the table shown in FIG. 5 as a function of $\sigma_1''$. This quantization index is limited to a maximum value L, which is also taken from the table shown in FIG. 5.

Finally, a vector lookup index V is calculated as:

$$V=CI+Q, \tag{17}$$

where CI is looked up in the table shown in FIG. 5 and Q is derived in equation (16).

This index, V, selects the quantized prediction coefficients $h_1$ and $h_2$ from the table shown in FIG. 6. The latter shows a collection of valid sets of quantized prediction coefficients. In this example, each set of quantized prediction coefficients includes a pair of numbers. That is, the table of FIG. 6 represents a collection of filters, where each particular index value selects a set of filter coefficients that define a particular filter. The table represented by FIG. 6 is stored in a memory (not shown).

The selected quantized prediction coefficients are then provided to analysis filter 180, which calculates an estimate of the current sample from equation (2). In addition, the vector lookup index V is transmitted to the remote receiver, SVD modem 200. The latter stores a table similar to that shown in FIG. 6 for recovering the selected set of quantized prediction coefficients used by the transmitter portion of SVD modem 100. In this example, this index ranges in value from 0 to 63.

In accordance with a feature of the invention, the collection of filters presented in FIG. 6 provides more resonances in the lower frequencies than would a collection of filters resulting from a prior art implementation which utilized uniform quantization. This provides a better filter response when the analog signal is a voice signal. This is illustrated in FIG. 7, which shows a pole-zero plot of the collection of filters represented by the table of FIG. 6. As known in the art, a pole-zero plot is shown in the "z-domain" and represents the response of a digitally sampled discrete time system. The frequency is represented by the "phase" around the unit circle. In FIG. 7, the pole-zero plot covers the frequency range 0 to ¾Π, where a phase of Π represents ½ of the sampling rate. For simplicity, only "zeroes" are shown in FIG. 7.

The numbers in the table of FIG. 6 were empirically determined to make the above-described selection process of the prediction coefficients simpler. In particular, in FIG. 7, warped radial line 911 passes through the zeroes corresponding to a subset of filters with a common value of $\sigma_1$. In the method described above, a particular value of $\sigma_1$ is mapped, or sliced, into a quantized value of $\sigma_1$ by referring to the table of FIG. 5. The quantized value of $\sigma_1$ represents a particular radial line on the pole-zero plot of FIG. 7. Similarly, a constant radius line, as illustrated by radius line 912, passes through the zeroes corresponding to a subset of filters with a common $h_2$ value. For example, one group of filters is represented by those filters associated with the Index values of: 1, 6, 11, 16, 22, 27, 32, 37, 42, 47, 52, 56, 60, and 63. Each of the filters in this group has the same value for $h_2$. At each intersection of a warped radial and a constant radius are the prediction coefficients for a particular filter. Empirically, this was performed by plotting increments of $h_2$ values for a given value of $\sigma_1$ that resulted in stable filters. The above described inventive concept for selecting the prediction coefficients is, in effect, mapping the actual values of $\sigma_1$ and $\sigma_2$ into a corresponding set of quantized values, i.e., a particular filter. Equations 13, 14, 15, 16, and 17, represent an empirical tweaking because, in actuality, $\sigma_1$ and $\sigma_2$ are not completely orthogonal, i.e., independent, to each other. As the value of $\sigma_1$ changes, the corresponding value of $\sigma_2$ is effected.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, although the invention is illustrated herein as being implemented with discrete functional building blocks, e.g., encoders, decoders, transmitter, etc., the functions of any one or more of those building blocks can be carried out using one or more appropriate programmed processors, e.g., a digital signal processor.

In addition, although the inventive concept was described in the context of an SVD signal, it should be realized that other forms of simultaneous voice and data transmission could be used, e.g., simple time-division multiplexing of a digitized voice signal and a data signal. Also, predictors of any order may be used, and such predictors may include variations such as bandwidth expansion, zeroes, and poles in the analysis filter, or other variations. In addition, the prediction can be applied to various points within the SVD system as opposed to the analog input signal described above. Finally, although described in the context of a two-dimensional QAM signal space, the latter can be N-dimensional.

What is claimed:

1. A method for use in a communications device comprising the steps of:

generating discrete-time sampled values of a signal;

generating a set of normalized autocorrelation coefficients from the sampled values; and selecting a set of quantized prediction coefficients as a function of normalized autocorrelation coefficients without determining a set of non-quantized prediction coefficients.

2. The method of claim 1, further comprising the steps of:

calculating a residual of the sampled values as a function of the selected set of quantized coefficients; and transmitting the residual of the sampled values to an opposite communications device.

3. The method of claim 2, wherein the step of transmitting the residual of the sampled values is transmitted as part of a simultaneous voice and data signal.

4. The method of claim 1 wherein the communications device is a modem and the signal is a voice signal.

5. A method for use in a communications device comprising the steps of:

providing a sample of a signal;

generating a set of normalized autocorrelation coefficients from the sample; and selecting a set of quantized prediction coefficients as a function of the set of normalized autocorrelation coefficients without determining a set of non-quantized prediction coefficients.

6. The method of claim 5 further comprising the steps of:

calculating an index from the selected set of quantized coefficients; and transmitting the index to an opposite communications device.

7. The method of claim 5 wherein the communications device is a modem and the signal is a voice signal.

8. Communications device apparatus comprising:

means responsive to an input signal for selecting a set of quantized prediction coefficients; and means for filtering the input signal in accordance with the selected set of quantized prediction coefficients;

wherein the means responsive to the input signal selects the set of quantized prediction coefficients as a function of a set of normalized autocorrelation coefficients without determining a set of non-quantized prediction coefficients, where the normalized autocorrelation coefficients are a function of the input signal.

9. The apparatus of claim 8 further comprising:

means responsive to the filtered input signal and the input signal for providing a residual signal; and means for transmitting the residual signal to an opposite communications device.

10. The apparatus of claim of 9 wherein the input signal is a voice signal and the communications device is a modem.

11. The apparatus of claim 9 wherein the means for transmitting transmits the residual signal as a part of a simultaneous voice and data signal.

12. Apparatus for use in a communications device, the apparatus comprising:

means for providing a sample of a signal; and means for providing a residual of the sample of the signal;

wherein the means for providing the residual of the sample determines the residual as a function of a set of quantized coefficients that are selected as a function of a set of normalized autocorrelation coefficients without determining a set of non-quantized prediction coefficients, and the set of normalized autocorrelation coefficients are a function of the sample of the signal.

13. The apparatus of claim 12 further comprising means for transmitting the residual of the sample to an opposite communications device.

14. The apparatus of claim 13 wherein in the transmitting means transmits the residual of the sample as part of a simultaneous voice and data signal.

15. The apparatus of claim 12 wherein the communications device is a modem and the signal is a voice signal.

16. Apparatus for use in a communications device, the apparatus comprising:

means for providing a sample of a signal; and means for providing an index;

wherein the means for providing the index determines the index as a function of a set of quantized coefficients that are selected as a function of a set of normalized autocorrelation coefficients without determining a set of non-quantized prediction coefficients, and the set of normalized autocorrelation coefficients are a function of the sample of the signal.

17. The apparatus of claim 16 further comprising means for transmitting the index to an opposite communications device.

18. The apparatus of claim 16 wherein the communications device is a modem and the signal is a voice signal.

19. Communications device apparatus comprising:

a filter for filtering an input signal;

means responsive to the input signal for selecting a set of filter coefficients of the filter; and means for generating a residual signal as a function of the input signal and an output signal of the filter;

wherein the means responsive to the input signal selects the set from a collection of filter coefficient sets, and the collection is divided into a number of filter coefficient groups, where each set of filter coefficients in the same group has at least one identical filter coefficient.

20. The apparatus of claim 19 wherein the number of filter coefficients in each set is two.

21. The apparatus of claim 19 wherein the means responsive to the input signal selects the set of filter coefficients by performing a selection function that does not determine a non-quantized set of filter coefficients.

22. The apparatus of claim 19 wherein the means responsive to the input signal selects the set of filter coefficients as a function of a set of normalized autocorrelation coefficients without determining a set of non-quantized filter coefficients, and the set of normalized autocorrelation coefficients are a function of the input signal.

23. Communication device apparatus comprising:

means for storing a collection of sets of filter coefficients; and means responsive to an input signal for selecting a set of filter coefficients as a function of a set of normalized autocorrelation coefficients;

wherein the collection of sets is divided into a number of filter coefficient groups, where each set of filter coefficients in the same group have at least one identical filter coefficient.

24. The apparatus of claim 23 further comprising means for filtering the input signal, where the means for filtering uses the selected set of filter coefficients; and means for providing a residual signal as a function of the input signal and the filtered input signal.

25. The apparatus of claim 23 wherein the number of filter coefficients in each set is two.

26. The apparatus of claim 23 wherein the selection function performed by the means responsive to the input signal does not determine a non-quantized set of filter coefficients.

* * * * *